No. 837,390. PATENTED DEC. 4, 1906.
J. A. EASTON & J. GREENFIELD.
FEED RESERVOIR AND BOX FOR HORSES AND THE LIKE.
APPLICATION FILED FEB. 14, 1906.

WITNESSES:

INVENTORS
John Andrew Easton
Joseph Greenfield
By Richard
ATT'YS.

THE NORRIS PETERS CO., WASHINGTON, D. C.

UNITED STATES PATENT OFFICE.

JOHN ANDREW EASTON AND JOSEPH GREENFIELD, OF DUNEDIN, NEW ZEALAND.

FEED RESERVOIR AND BOX FOR HORSES AND THE LIKE.

No. 837,390.     Specification of Letters Patent.     Patented Dec. 4, 1906.

Application filed February 14, 1906. Serial No. 301,052.

*To all whom it may concern:*

Be it known that we, JOHN ANDREW EASTON, groom, and JOSEPH GREENFIELD, laborer, residing at Dunedin, New Zealand, have invented certain new and useful Improvements in Feed Reservoirs and Boxes for Horses and the Like, of which the following is a specification.

The object of this invention is the provision of a feed-reservoir wherefrom feed is automatically and gradually as required supplied to a box from which an animal may eat it without waste and whereby the feed is kept fresh for eating.

Minor features of the invention are a large-meshed grating in the feed-reservoir to prevent long straws entering with the feed and a slidable door at the lower end of the feed-reservoir for regulating purposes and a fine-meshed grating which may be slidable, closing the lower end of the feed-box, so that dust and the like may escape therefrom. There are also wires in the feed-box to prevent the rooting out of the feed by the horse and a device to throw back displaced feed into the middle of the box.

The invention consists of these features and of the features and combination and arrangement of parts hereinafter described, and more particularly set forth in the claims.

Figure 1:
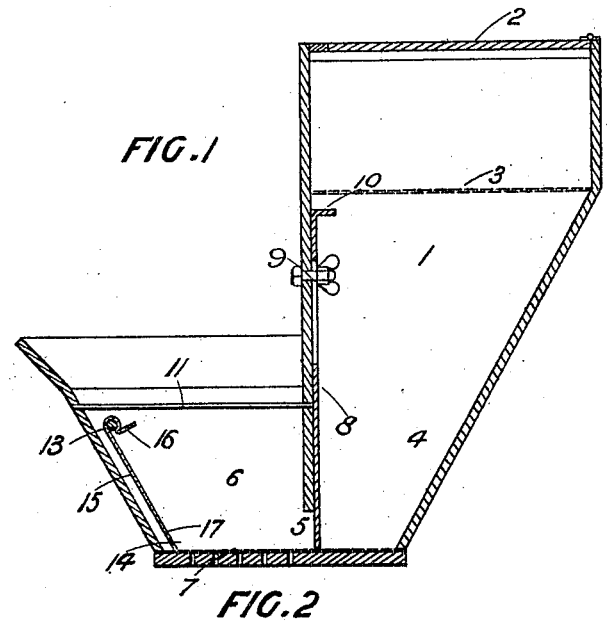
Figure 2:
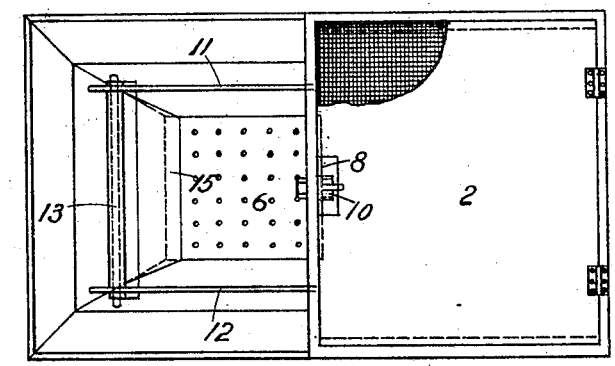
Figures 3, 4:
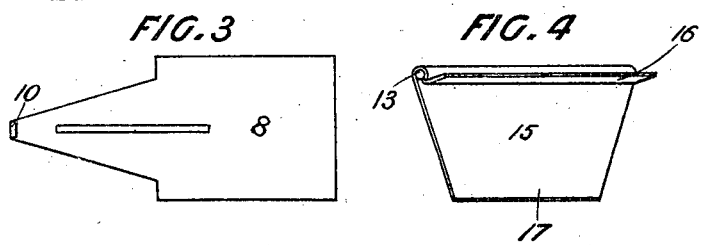

In the accompanying drawings, illustrating the invention, Figure 1 is a sectional elevation. Fig. 2 is a plan view. Fig. 3 is a plan of the slidable door. Fig. 4 is a perspective view of the throw-back device.

The device is attached to a wall by suitable means and supported by stays. The feed-reservoir 1 has a lid or cover 2, and it has a grating 3 to prevent long straws and the like from passing through with the feed. This reservoir 1 has its lower end 4 contracted, so as to concentrate the feed on a passage 5 at one side which opens into the feed-box 6. The bottom 7 of the feed-box is perforated with small holes to enable dust and the like to escape.

For the purpose of regulating the supply of feed the feed-reservoir is provided with a door 8, slidable on a guide-pin 9 and clampable in a desired position by a wing-nut and forms a regulating-shutter. It is operatable by means of a hook-handle 10 or the like. Wires 11 12 13 are secured inside the feed-box parallel to three sides, respectively, so that when the horse roots the feed with his nose the latter is prevented by the wires from moving sufficiently to throw the feed out of the box. In order to throw the feed into the box again from the corner 14 into which the rooting action before mentioned has moved it, the device 15, which we call a "throw-back," more particularly shown in Fig. 4, is employed. This device consists of a thin sheet bent so as to hinge on the wire 13 and having a short end 16 projecting upwardly and a longer end 17 extending to the bottom of the feed-box.

The reservoir is filled with feed which passes down the contracted portion by gravity into the feed-box, flowing through the passage as the horse eats the feed, the size of the passage being adjusted by the regulating-shutter as desired to give the desired flow. As the horse roots at the feed the side of his nose and jaws strikes the upwardly-projecting short end 16 of the throw-back device, which causes the other end 17 to kick or throw back the feed into the middle of the box.

Having now described our invention, what we claim as new, and desire to secure by Letters Patent, is—

1. A feed-trough comprising a feed-reservoir, a feed-box, said reservoir and said feed-box being connected by a passage, a shutter controlling said passage, and horizontal wires extending around the inside of said feed-box near the top thereof, substantially as described.

2. A feed-trough comprising a feed-reservoir, a feed-box said reservoir and said feed-box being connected by a passage, means for controlling the passage of feed through said passage, and a throw-back pivoted within said feed-box, substantially as described.

3. A feed-trough comprising a feed-reservoir a feed-box, said reservoir and said box being connected by a passage, means for controlling the passage of feed through said passage, a plate pivotally mounted within said feed-box, and an inwardly-extending lip near the top of said plate, substantially as described.

4. In a feed-trough, a plate pivotally mounted in said trough against the front side thereof and an inwardly-extending lip near the top of said plate, substantially as described.

In witness whereof we have hereunto set our hands in presence of two witnesses.

JOHN ANDREW EASTON.
JOSEPH GREENFIELD.

Witnesses:
  A. J. PARK,
  R. C. PARK.